No. 672,935. Patented Apr. 30, 1901.
W. P. FLINT.
ATTACHMENT FOR FLUID METERS.
(Application filed Sept. 6, 1900.)
(No Model.) 2 Sheets—Sheet 1.

WITNESSES:
C. L. Belcher
Birney Hines

INVENTOR
William P. Flint
BY
Wesley G. Carr
ATTORNEY.

No. 672,935. Patented Apr. 30, 1901.
W. P. FLINT.
ATTACHMENT FOR FLUID METERS.
(Application filed Sept. 6, 1900.)
(No Model.) 2 Sheets—Sheet 2.

WITNESSES:
C. L. Belcher
Birney Hines

INVENTOR
William P. Flint
BY
Wesley G. Carr
ATTORNEY.

UNITED STATES PATENT OFFICE.

WILLIAM P. FLINT, OF PITTSBURG, PENNSYLVANIA.

ATTACHMENT FOR FLUID-METERS.

SPECIFICATION forming part of Letters Patent No. 672,935, dated April 30, 1901.

Application filed September 6, 1900. Serial No. 29,204. (No model.)

*To all whom it may concern:*

Be it known that I, WILLIAM P. FLINT, a citizen of the United States, residing at Pittsburg, in the county of Allegheny and State of Pennsylvania, have invented new and useful Improvements in Attachments for Fluid-Meters, of which the following is a specification.

My invention relates to fluid-meters, and has particular reference to proportional meters employed for measuring gas, though not restricted to such specific relations.

The object of my invention is to provide an apparatus that will protect meters of the character above indicated from injuries due to excessively high rates of discharge. With this end in view I have devised the means shown in the accompanying drawings, in which—

Figure 1:
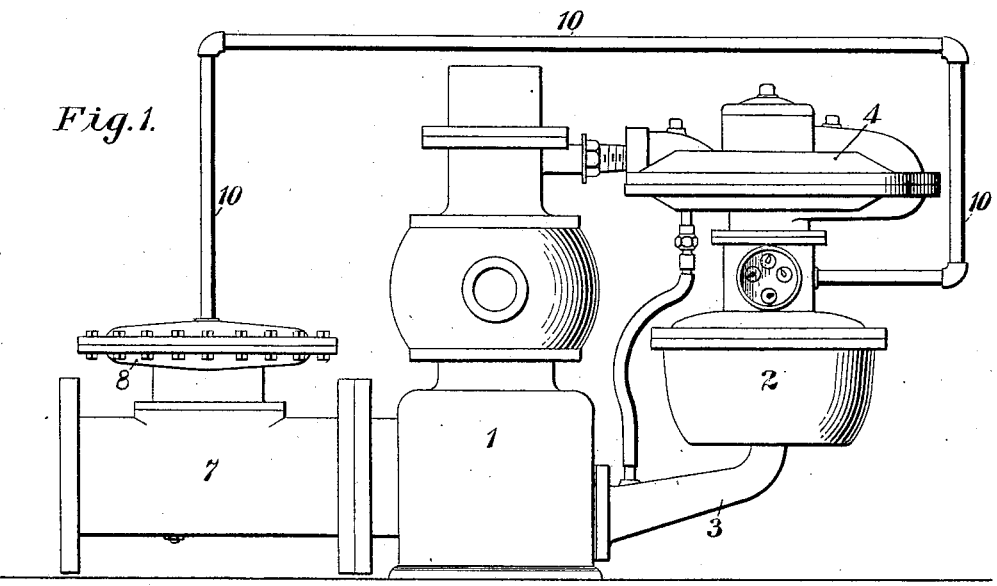
Figure 2:
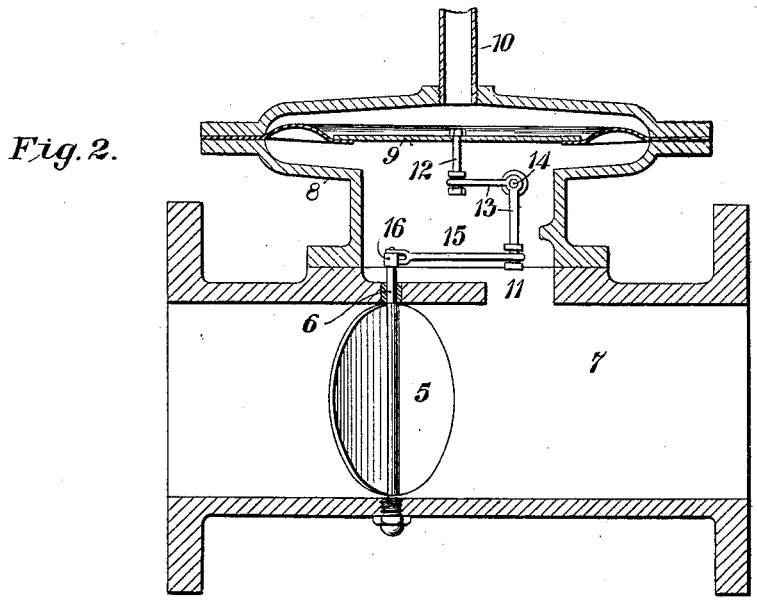
Figure 3:
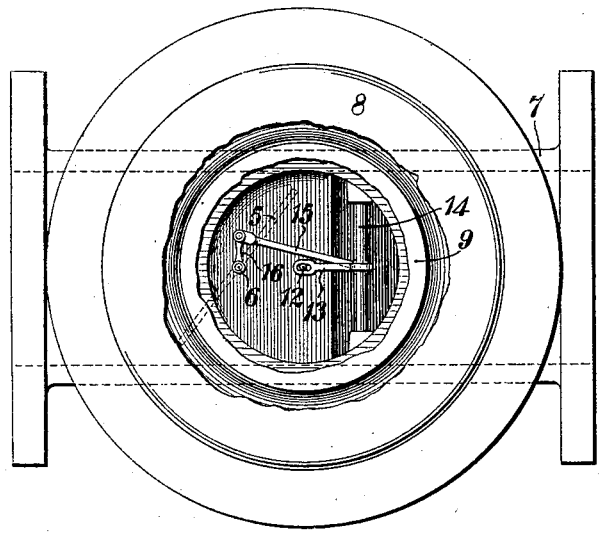
Figure 4:
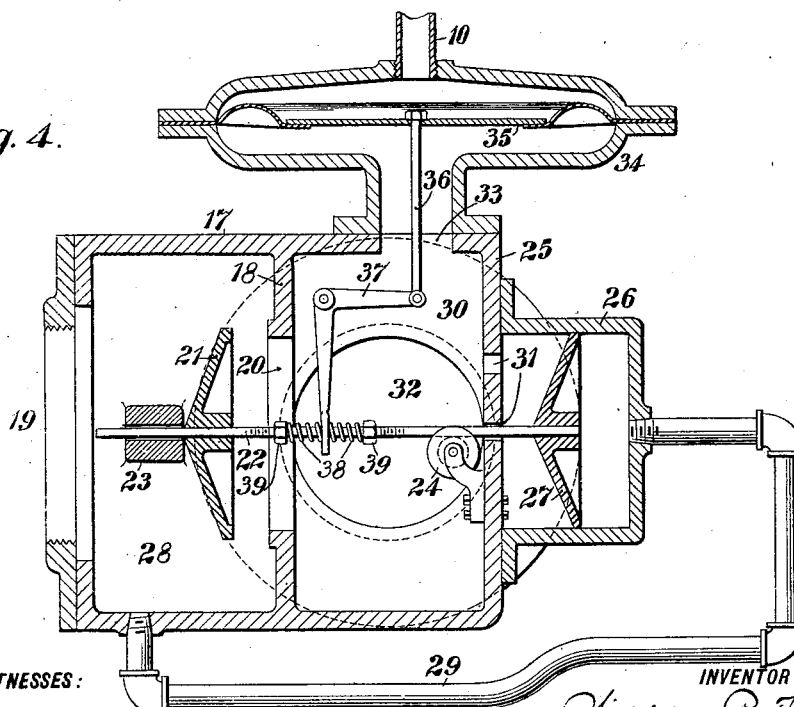

Figure 1 is a front elevation of a proportional meter provided with my improvement. Fig. 2 is a vertical sectional view, on an enlarged scale, of the apparatus embodying my invention. Fig. 3 is a plan view, partially broken away, of the apparatus shown in Fig. 2. Fig. 4 is a longitudinal vertical section of a modified form of protecting apparatus.

Referring now to Figs. 1, 2, and 3, 1 is the casing of that portion of a proportional meter through which the main volume of the gas passes and which may be provided with such valves and other apparatus as is usual or may be desired. The tally-meter 2 is connected to the casing 1 by means of a pipe 3 in the usual manner and is provided with the usual form of regulator 4, through which the gas flows after passing through the tally-meter. The balanced protecting-valve 5 is shown in Figs. 2 and 3 as a circular disk mounted upon a vertical shaft 6 after the style of a stove-pipe-damper, the valve being mounted in pipe 7, leading to the casing 1 of the meter. Mounted upon the pipe 7, between the valve 5 and the casing 1, is a regulator-casing 8, having therein a weighted diaphragm 9 of usual construction. The space above the diaphragm 9 is connected to the outlet of the tally-meter 2 by means of a pipe 10, and the space below the diaphragm communicates with the pipe 7 by means of a comparatively wide opening 11. The diaphragm 9 is connected to the shaft 6 of the valve 5 by means of a rod 12, a bell-crank lever 13, mounted upon a horizontal shaft 14, a link 15, and an arm 16, the connection being such that when the flow of gas through the tally-meter increases either suddenly or gradually beyond the safe limit the excess of pressure acting upon the under side of the diaphragm 9 lifts it and, through the connecting-rod, shafts, and levers, operates the shaft 6, and with it the valve 5, and thus serves to reduce the flow of gas through the pipe 7. As soon as this reduction of the amount of gas flowing through the meter effects a reduction of the drop in pressure across the tally-meter to the predetermined safe maximum hereinbefore mentioned the diaphragm will obviously move downward and turn the valve 5, so as to admit more gas to the meter. So long as the drop in pressure across the tally-meter remains less than the predetermined safe maximum for which the apparatus is designed and adjusted the protecting-valve will stand wide open, and therefore permit an unobstructed flow of gas through the meter. If, however, the pressure increases, either suddenly or gradually, materially beyond that for which the apparatus is designed and adjusted, the protecting-valve will come into action and prevent the injuries to the meter which might result from its operation at an excessive speed.

In Fig. 4 of the drawings I have shown a modification of the protecting device in which the pipe or casing 17, leading to the meter, is provided with a transverse partition 18, having a port 20, controlled by a valve 21, which is mounted upon a longitudinally-movable rod or stem 22, having suitable bearings 23 and 24. The valve rod or stem 22 projects through the end wall 25 of casing 17 into a cylinder 26 and at its end is provided with a balancing plate or piston 27, that has a free-working fit in that cylinder. The outer end of the cylinder is connected with the chamber 28 in the casing 17 by means of a pipe 29, and its inner end is in communication with the chamber 30 of the casing 17 by means of one or more comparatively small openings 31. The gas is admitted to the chamber 28 in the casing 17 through an opening 19 and passes from chamber 30 into the meter through an opening 32. The chamber 30 also communicates through an opening 33 with a regulator-chamber 34, containing a loaded diaphragm 35, communication between the space above the diaphragm and the outlet of the tally-meter being provided by means of a pipe 10, as shown in Fig. 1. The diaphragm 35 is connected to the valve-stem 22 by means of a rod 36 and a bell-crank lever 37. Cushioning-springs 38 may be interposed between the forked or apertured end of the lever and nuts 39 adjustably mounted on the stem 22, as indicated, or they may be omitted, if desired. With this construction of apparatus if the flow of gas through the meter is normal the operating parts will stand in substantially the positions indicated in the drawings, and there will be a regular uninterrupted flow of gas through the meter. If, however, the rate of flow increases materially beyond that for which the meter is designed, the valve 21 will be partially or wholly closed, and will thus to a greater or less extent reduce the flow of gas. If the increase of flow is sudden, the gas will act directly upon the valve 21 before it has time to act in opposition thereto against the piston 27, and if the increase of flow is gradual the piston 27 will balance the valve 21 and the diaphragm 35 will be raised by the extra pressure exerted below it and will act through rod 36 and lever 37 to move the valve 21 toward its seat, and thus effect a reduction of the flow of gas.

While I have shown my protecting device located in the pipe or passage through which the gas flows to the meter, it obviously may be located either within the meter structure or at some other point outside the meter, provided it is so located as to be actuated by an abnormal drop in pressure across the measuring mechanism to prevent the operation of such mechanism at a dangerously high speed without affecting the accuracy of the same.

Although shown applied to a proportional meter, it is equally applicable to meters in which all the gas is directly measured.

Structural modifications other than those shown may be made within the scope of my invention, and I therefore desire it to be understood that the invention is not restricted to the details of construction specifically illustrated and described.

I claim as my invention—

1. The combination with a fluid-meter, of a balanced valve located in the path of the current of fluid, a loaded diaphragm in position to be actuated by an excessive drop in fluid-pressure across the meter and operating connections between said valve and said diaphragm, whereby the valve is actuated to reduce the flow of fluid to the meter when the drop in pressure exceeds a predetermined maximum.

2. The combination with a gas-meter, of a balanced valve located in the path of the current of gas, a movable device acted upon by the gas before it enters the meter and by the gas after it leaves the meter in opposition and connections between said device and the balanced valve whereby an excessive drop in pressure across the meter serves to partially close said valve.

3. The combination with a proportional gas-meter, of a balanced valve located in the path of the whole current of gas, a diaphragm subject on one side to the pressure of the gas entering the tally-meter and on the other side to the pressure of the gas after leaving the tally-meter and operating connections between the diaphragm and the balanced valve whereby an excessive drop in pressure between the inflowing gas and the outflowing gas serves to partially close said valve.

4. The combination with a proportional meter, of a sluggishly-balanced valve located in the path of the whole flow of gas and actuated directly by a suddenly-increased flow of gas, a weighted diaphragm subject to the drop in pressure across the tally-meter and connections between the diaphragm and the valve whereby said diaphragm will control the position of said valve so long as the changes in the flow of gas are gradual.

5. The combination with a proportional meter, of a protecting-valve in the path of the whole current of gas which closes in the direction of flow and has a balancing means that responds to a change in the drop of pressure across said valve subsequent to the occurrence of such change, a weighted diaphragm subject to the drop in pressure across the tally-meter and connections between said diaphragm and the protecting-valve whereby a gradual increase in the pressure drop will effect a proper adjustment of said valve.

6. The combination with a proportional meter, of a protecting-valve in the path of the whole current of gas which closes in the direction of flow and is balanced by a means which is only effective for slow changes in the drop of pressure across said valve, a weighted diaphragm subject to the drop of pressure across the tally-meter and connections between said diaphragm and the protecting-valve whereby the valve may respond instantly to sudden changes across itself and gradually to changes across the tally-meter.

In testimony whereof I have hereunto subscribed my name this 27th day of August, 1900.

WM. P. FLINT.

Witnesses:
EDWIN RUND,
BIRNEY HINES.